(12) United States Patent
Gaignet

(10) Patent No.: US 7,938,956 B2
(45) Date of Patent: *May 10, 2011

(54) WATER PURIFICATION SYSTEM AND METHOD, AND MODULE FOR THE SYSTEM

(75) Inventor: Yves Gaignet, Montigny le Bretonneux (FR)

(73) Assignee: Millipore Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/704,807

(22) Filed: Feb. 12, 2010

(65) Prior Publication Data

US 2010/0155248 A1 Jun. 24, 2010

Related U.S. Application Data

(63) Continuation of application No. 12/151,691, filed on May 8, 2008, now Pat. No. 7,686,950, which is a continuation of application No. 10/793,404, filed on Mar. 4, 2004, now Pat. No. 7,407,585.

(51) Int. Cl.
    *B01D 17/12* (2006.01)
(52) U.S. Cl. ........ 210/110; 204/518; 204/542; 210/134; 210/137; 210/195.2; 210/258; 210/259; 210/321.65
(58) Field of Classification Search .......... 204/517–532, 204/542, 627–637; 210/134, 137, 195.1, 210/243, 259, 321.65, 637, 650, 652, 748, 210/805, 806, 195.2, 195.3, 258, 110; 138/40, 138/45, 46
See application file for complete search history.

(56) References Cited

U.S. PATENT DOCUMENTS

| 3,716,141 | A | * | 2/1973 | Spatz | 210/194 |
| 4,261,834 | A | | 4/1981 | deWinter | |
| 4,574,049 | A | * | 3/1986 | Pittner | 210/639 |
| 4,808,287 | A | | 2/1989 | Hark | |
| 5,227,062 | A | | 7/1993 | Olsen | |
| 5,282,972 | A | * | 2/1994 | Hanna et al. | 210/652 |
| 5,520,816 | A | * | 5/1996 | Kuepper | 210/649 |
| 5,762,789 | A | | 6/1998 | de los Reyes et al. | |

(Continued)

FOREIGN PATENT DOCUMENTS

| JP | 59-123762 A | 8/1984 |
| JP | 60-112759 A | 7/1985 |

OTHER PUBLICATIONS

French Search Report dated Dec. 1, 2001 in co-pending application (FR0303110).

(Continued)

*Primary Examiner* — Joseph W Drodge
(74) *Attorney, Agent, or Firm* — Nields, Lemack & Frame, LLC

(57) ABSTRACT

The invention relates to a method and a system for purifying water whereby:
  the water to be purified is pressurized (13);
  a pressurized flow of said water is directed onto at least one selective permeability membrane to divide (11) the flow of pressurized water into a permeate flow and a retentate flow;
  the permeate flow is electrodeionized (12) to produce a flow of purified water consisting of the electrodeionized permeate flow;
  the flowrate of the retentate flow (19) is reduced;
  a substantially constant predetermined pressure (21) is maintained on the selective permeability membrane(s); and
  a substantially constant predetermined permeate flowrate is maintained.
It also relates to a tangential filtration module suitable for the above kind of system.

3 Claims, 2 Drawing Sheets

U.S. PATENT DOCUMENTS

| | | | |
|---|---|---|---|
| 5,919,357 A | 7/1999 | Wilkins et al. | |
| 6,001,244 A * | 12/1999 | Salter et al. | 210/104 |
| 6,190,558 B1 * | 2/2001 | Robbins | 210/652 |
| 6,350,382 B1 | 2/2002 | Schick | |
| 6,564,824 B2 | 5/2003 | Lowery et al. | |
| 6,571,831 B1 | 6/2003 | Hart | |
| 6,607,668 B2 | 8/2003 | Rela | |
| 7,122,149 B2 | 10/2006 | Li et al. | |
| 7,407,585 B2 | 8/2008 | Gaignet | |
| 7,686,950 B2 | 3/2010 | Gaignet | |
| 2003/0034292 A1 | 2/2003 | Rela | |

OTHER PUBLICATIONS

Office Actions dated Jul. 10, 2006, Dec. 13, 2006, Jul. 24, 2007 and Notice of Allowances dated Feb. 11, 2008 and May 12, 2008 in corresponding U.S. Appl. No. 10/793,404 (Now U.S. Patent 7407585).

Office Actions dated Sep. 24, 2008, Feb. 24, 2009, Jun. 22, 2009 and Notice Allowance dated Nov. 19, 2009 in corresponding U.S. Appl. No. 12/151,691 (Now U.S. Patent 7686950).

Japanese communication dated Jun. 22, 2010 in corresponding foreign application (JP2004-047241).

* cited by examiner

WATER PURIFICATION SYSTEM AND METHOD, AND MODULE FOR THE SYSTEM

This application is a continuation of U.S. Ser. No. 12/151,691 filed on May 8, 2008, now U.S. Pat. No. 7,686,950 which is a continuation of U.S. Ser. No. 10/793,404 filed on Mar. 4, 2004 now U.S. Pat. No. 7,407,585, (and claiming priority of FR 0303110 filed Mar. 13, 2003), the disclosures of which are hereby incorporated by reference.

The present invention relates generally to a system and a method of purifying water. It addresses more particularly the situation in which the water is subjected to two different purification processes, namely separation by means of at least one selective permeability membrane followed by deionization.

One prior art water purifying system of the above kind comprises:

a pump having an aspiration side adapted to aspirate water to be purified and a discharge side adapted to discharge under pressure water entering the pump;

liquid phase separation means operating by permeation through at least one selected permeability membrane as a result of a pressure gradient and having an inlet in fluid communication with the discharge side of the pump, a permeate outlet, and a retentate outlet;

electrodeionization means having a permeate inlet in fluid communication with the permeate outlet of the separation means and a purified water outlet;

means for evacuating the retentate from the system, in fluid communication with the retentate outlet of the separation means and incorporating a restriction to reduce the retentate flowrate at the outlet of the system; and communication means whereby the evacuation means communicate with the aspiration side of the pump, between the retentate outlet of the separation means and the restriction and incorporating a pressure regulator to maintain, in conjunction with the pump, a substantially constant predetermined pressure at the inlet of the separation means.

A general object of the present invention is a simple way of improving a system of the above kind that additionally has other advantages.

To be more precise, the present invention consists in a water purification system comprising:

a pump having an aspiration side adapted to aspirate water to be purified and a discharge side adapted to discharge under pressure water entering the pump;

liquid phase separation means operating by permeation through at least one selective permeability membrane as a result of a pressure gradient and having an inlet in fluid communication with the discharge side of the pump, a permeate outlet, and a retentate outlet;

electrodeionization means having a permeate inlet in fluid communication with the permeate outlet of the separation means and a purified water outlet;

means for evacuating the retentate out of the system, in fluid communication with the retentate outlet of the separation means and incorporating a restriction to reduce the retentate flowrate at the outlet of the system; and communication means whereby the evacuation means communicate with the aspiration side of the pump, between the retentate outlet of the separation means and the restriction and incorporating a pressure regulator to maintain, in conjunction with the pump, a substantially constant predetermined pressure at the inlet of the separation means;

which system is characterized in that a flowrate regulator is disposed in the permeate flow path from the separation means to the electrodeionization means to maintain a substantially constant predetermined permeate flowrate.

In other words, compared to prior art systems, the invention exploits the presence of a single additional component—the flow regulator—in order, firstly, to supply the electrodeionization means situated downstream of the flowrate regulator at a predetermined constant flowrate, regardless of the phenomena that might have caused the flowrate to vary, and, secondly, to have the separation means, which are of the kind defined above and situated upstream of the flowrate regulator, operate with a predetermined constant rate of recovery (the ratio of the permeate produced by the separation means to the water consumed).

This improves the performance of the electrodeionization means, reduces water consumption, and achieves excellent operating conditions for the separation means.

In this regard, it must be pointed out that the performance of existing electrodeionization means, which are generally of modular design, depends on the flowrate of water fed to them. Furthermore, they can generally operate only with a limited water supply pressure.

In contrast, the separation means of the above kind using tangential filtering known in the art at present, whether employing reverse osmosis, ultrafiltration, nanofiltration or microfiltration modules, are generally fabricated with relatively wide tolerances in respect of the permeate flowrate—in practice of the order of ±15%—and the flowrate of the permeate leaving the separation means generally varies by approximately 3% per ° C. In practice, it is found that the permeate water flowrate of a reverse osmosis module can vary in a ratio of 1 to 2 when the water temperature varies from 10 to 30° C. It will also be noted that the permeate water flowrate generally tends to change as the module ages.

Moreover, too high a recovery rate generally reduces the purification performance of this kind of module and also risks damaging its membrane(s), whereas too low a recovery rate increases the quantity of residuary or rejected water (retentate).

In an embodiment that is preferred for reasons of economy, the flowrate regulator includes a deformable member for reducing the effective flow section through the flowrate regulator in the event of an upstream pressure rise, so as to maintain the permeate flowrate at the substantially constant predetermined value.

For example, the deformable member can be an elastic eyelet forming a variable orifice and preferably made of elastomer.

The pressure regulator can include a cartridge in which the elastic eyelet is accommodated.

Alternatively, a flowrate regulator can be used that includes a motorized flowrate regulation valve operated by an automatic controller.

The pressure regulator is preferably variable and manually adjustable or operated by an automatic controller.

The restriction can comprise a plate in which a fixed orifice is formed, but is preferably a variable orifice adjustable manually or by an automatic controller.

For reasons of economy, the restriction preferably comprises a needle valve or a capillary tube.

For reasons of economy and ease of fabrication, fluid communication between the pump and the separation means and between the latter and the electrodeionization means are preferably established by means of at least one pipe in each case.

Likewise, the evacuation means and the communication means preferably each include a pipe equipped with a respective restriction and a respective pressure regulator.

The system according to the invention also lends itself to a development whereby the separation means include one or more identical tangential filtration modules, in particular operating by reverse osmosis, ultrafiltration, nanofiltration or microfiltration, the module or each module including a permeate manifold and being accommodated in a chamber having a permeate outlet in fluid communication with the manifold of the associated module, and there is a flowrate regulator at the permeate outlet or in the permeate manifold of the module or each module or at the inlet of the electrodeionization means of the module or each module. Thus it is possible to improve existing water purification systems by means of the invention at the time of changing a module.

Alternatively, the flowrate regulator could be at the inlet of the electrodeionization means.

The invention also provides a tangential filtration module assembly, in particular operating by reverse osmosis, ultrafiltration, nanofiltration or microfiltration, including a tangential filtration module with at least one selective permeability membrane and a permeate manifold accommodated in a chamber having an inlet for fluid to be treated, an outlet for permeate produced by the module, in fluid communication with the permeate manifold, and an outlet for retentate produced by the module, characterized in that there is a flowrate regulator at the permeate outlet or in the permeate manifold.

The invention further provides a method of purifying water comprising the steps of:
  pressurizing the water to be purified;
  directing a pressurized flow of said water onto at least one selective permeability membrane to divide the flow of pressurized water into a permeate flow and a retentate flow;
  electrodeionizing the permeate flow to produce a flow of purified water consisting of the electrodeionized permeate flow;
  reducing the flowrate of the retentate flow; and
  maintaining a substantially constant predetermined pressure on the selective permeability membrane(s);
which method is characterized in that it further includes a step of maintaining a substantially constant predetermined permeate flowrate.

The features and advantages of the invention emerge from the following description, which is given by way of example and with reference to the accompanying diagrammatic drawings, in which.

Figure 1:
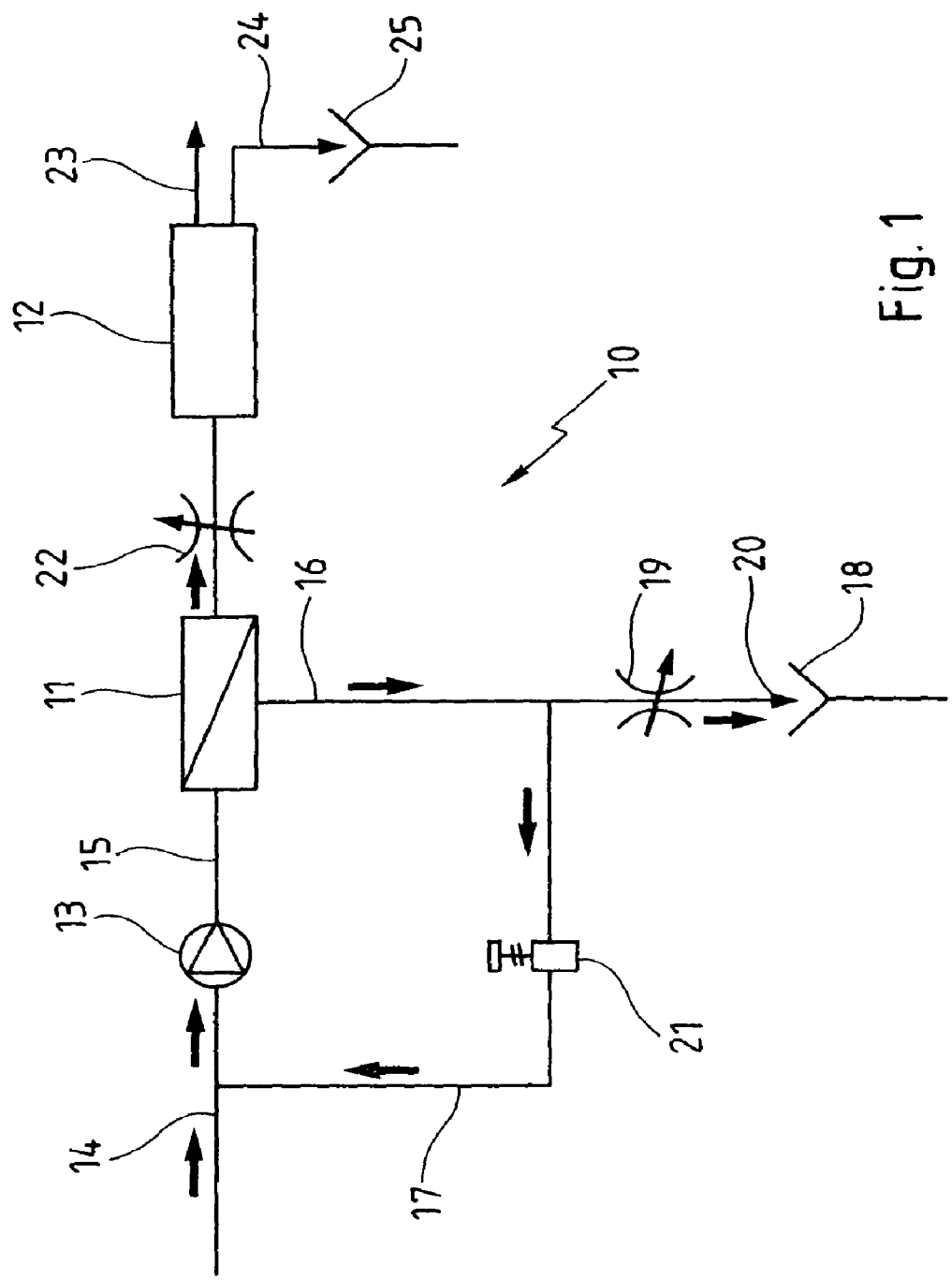
FIG. 1 is a flow diagram of a water purification system of the invention.

In the embodiment shown, the water purification system 10 of the invention includes, in the manner that is known in the art, for purification of water, a reverse osmosis module 11 and an electrodeionization module 12 downstream of the reverse osmosis module 11.

The modules 11, 12 are not in themselves relevant to the present invention and are not described in detail here.

Suffice to say that, in the embodiment shown, the reverse osmosis module 11 is a TW30 module from DOW CHEMICAL® and the electrodeionization module 12 is an EDI module from MILLIPORE®.

In practice, the flow of water to be purified is continuous and tangential to dense membranes of the reverse osmosis module 11, with the result that the water to be purified is divided at the membranes into two portions with different concentrations:
  a portion called the permeate, that passes through the membranes, and
  a portion called the retentate, that does not pass through the membranes and contains ions, molecules or particles held back by the membranes, in particular mineral ions.

The electrodeionization module 12 performs continuous demineralization by means of membranes, entailing fixing on resins and continuous regeneration of the resins by means of electrodialysis, and thus with no addition of reagents.

The water produced by a system 10 of the above kind can therefore be considered to have an extremely low level of dissolved salts (i.e. to constitute ultrapure water).

In the embodiment shown, the water to be purified comes from the drinking water main and is fed to a positive displacement pump 13 via an inlet pipe 14.

The positive displacement pump 13 discharges the water into the reverse osmosis module 11, via a feed pipe 15 of the module, at a sufficient pressure to obtain the nominal flowrate of the reverse osmosis module at low temperature.

In the embodiment shown, and as is also known in the art, a portion of the retentate leaving the reverse osmosis module 11 is fed by an evacuation pipe 16 to the outlet of the water purification system 10, whereas the remainder of the retentate is recirculated in the system via a recirculation pipe 17 connected to the inlet pipe 14 between the point at which that pipe is connected to the drinking water main and the inlet of the pump 13, in order to feed the latter with the portion of the retentate flowing in the recirculation pipe 17.

The retentate portion leaving the water purification system 10 is recovered by an evacuation manifold 18 connected to the drainage system.

The evacuation pipe 16 incorporates a restriction 19, i.e. a member for reducing the water flowrate and creating a pressure drop in the vicinity of the outlet 20 of the evacuation pipe 16.

In the embodiment shown, the restriction 19 is in practice a needle valve.

It will further be noted that the recirculation pipe 17 is connected to the evacuation pipe at a position between the retentate outlet of the reverse osmosis module 11 and the restriction 19, and that the recirculation pipe 17 incorporates a pressure regulator 21 so that, in conjunction with the pump 13, it maintains a substantially constant predetermined pressure in the reverse osmosis module 11, regardless of pressure variations in the inlet pipe 14.

In practice, this regulator is a standard counter-pressure regulator and is selected so that the pressure applied at the input of the reverse osmosis module 11 is sufficient to obtain the nominal flowrate of the module 11 at low temperature. To this end, the pressure regulator used here is, like the needle valve 19, of the variable and manually adjustable type. To be more precise, these components are adjusted by the control system (not shown in FIG. 1) of the water purification system 10 on the basis of reference values supplied to the control system by the user. Of course, this kind of component could instead lend itself to entirely manual adjustment, or even to operation by an automatic controller, i.e. with no human intervention, in particular using means adapted to recognize the characteristics of the reverse osmosis module 11 functionally connected to the control system of the water purification system 10.

According to the invention, and as is the case in the embodiment shown, a flowrate regulator 22 is disposed in the permeate flow path from the reverse osmosis module 11 to the electrodeionization module 12 to maintain a substantially constant predetermined permeate flowrate on the side of the electrodeionization module 12 opposite that having an outlet 23 for water treated by osmosis, an outlet 23 for deionized water (diluate) and an outlet 24 for concentrate (water containing ions that is drained off at 25).

In practice, the flowrate regulator 22 is located at the inlet of the electrodeionization module 12 and, in this embodiment, includes a deformable member for reducing the effective flow section through the flowrate regulator 22 in the event of a pressure rise on the upstream side, to maintain the substantially constant predetermined permeate flowrate at the inlet of the electrodeionization module, regardless of the phenomena that might cause the flowrate to vary.

In fact, the flowrate regulator 22 operates on the transmembrane pressure (counter-pressure) of the reverse osmosis module 11 to maintain the flowrate constant, in particular if the temperature of the water to be purified rises.

In practice, the above kind of automatic flowrate regulator regulates the flowrate to within ±5% when the pressure varies from 2 to 10 bar (1 bar=$1.10^5$ Pa).

Moreover, in this embodiment it is chosen as a function of the nominal flowrate of the reverse osmosis module 11, but instead could equally well be chosen as a function of the nominal flowrate of the electrodeionization module 12, or even as a function of the nominal flowrates of both modules 11 and 12.

Figure 2:
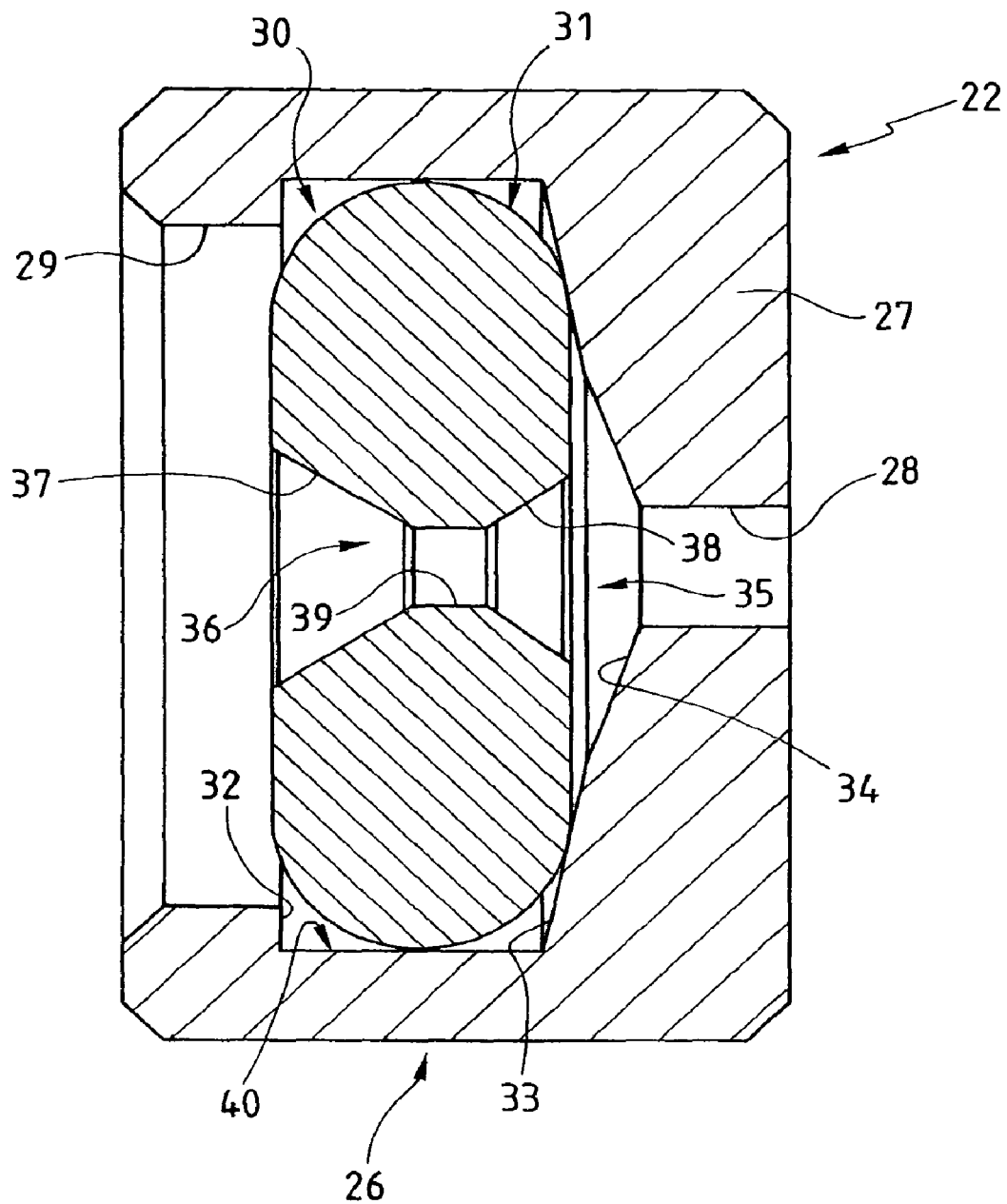
FIG. 2 is a view in section of a flowrate regulator used in the FIG. 1 system.

The flowrate regulator 22 is shown in more detail in FIG. 2.

It comprises a hollow cylindrical cartridge 26 closed at one end by an end disk 27 with a circular section cylindrical orifice 28 at its center through which water leaves the regulator 22.

At the opposite axial end, a circular section cylindrical fluid entry section 29 precedes a circular section cylindrical fluid passage section 30 which accommodates an elastic elastomer eyelet 31. Its diameter is much greater than that of the outlet orifice 28, but slightly less than that of the section 30, thereby forming therewith an annular rim 32 which, with a first truncated cone 33 following on from the section 30 accommodating the elastic eyelet 31, immobilizes the elastic eyelet 31 in the axial direction.

The first truncated cone 33 forms with a second truncated cone 34 that follows on from it a fluid passage section 35 that converges and terminates at the outlet orifice 28.

The first truncated cone 33 has a cone angle at the apex close to the normal to the axis of the cartridge 26.

The elastic eyelet 31 has a central orifice 36 formed by two portions 37 and 38, each in the shape of a truncated cone, situated on respective opposite sides of a circular section cylindrical portion 39. The portions 37-39 and the cartridge 26 are coaxial.

It will further be noted that, at rest, the eyelet 31 comes into contact with the internal cylindrical surface 40 of the cylindrical section 30 of the cartridge 26.

The dimensions of the various components of the flowrate regulator 22 are of course determined so that the chosen flowrate is obtained.

The flowrate regulator 22 is a flow controller from PLATON®.

Thanks to the above features, an increase in the flowrate of the water entering the flowrate regulator 22 compresses the elastic eyelet 35, which reduces the section of its fluid passage orifice 36, so that the permeate flowrate is maintained at a substantially constant value.

A water purification system 10 of the above kind has been operated with water at 7° C. and then at 25° C. under conditions specified in the following table by way of non limiting example:

TABLE

| Temperature of the water on entering the system | Flowrate and pressure of the water on entering the system | Flowrate and pressure of the water on entering the reverse osmosis module | Flowrate and pressure of the retentate upstream of the restriction | Flowrate and pressure of the retentate downstream of the restriction | Flowrate of the retentate in the recirculation pipe | Pressure of the permeate upstream of the flowrate regulator | Flowrate and pressure of the permeate downstream of the flowrate regulator |
|---|---|---|---|---|---|---|---|
| 7° C. | 100 l/h 3 bar | 400 l/h 10 bar | 350 l/h 10 bar | 50 l/h 0 bar | 300 l/h | 0 bar | 50 l/h 0 bar |
| 25° C. | 100 l/h 3 bar | 400 l/h 10 bar | 350 l/h 10 bar | 50 l/h 0 bar | 300 l/h | 5 bar | 50 l/h 0 bar |

As can be seen, the flowrate regulator 22 operates on the transmembrane pressure by applying a counter-pressure to the membrane of the reverse osmosis module 11 in order to maintain a constant flowrate of permeate if the temperature of the water rises. In practice the transmembrane pressure (the pressure at the inlet of the reverse osmosis module 11 minus the pressure at the outlet of the reverse osmosis module 11) is reduced from 10 bar to 5 bar.

It will be realized that the water purification system 10 according to the present invention achieves a constant production flowrate of water treated by osmosis regardless of the temperature of the inlet water of the reverse osmosis the module 11 and the pressure of the drinking water main.

On the other hand, the constant flowrate of water produced (i.e. of the permeate at the outlet of the reverse osmosis module 11) in conjunction with regulation of the rejected water flowrate (i.e. of the retentate at the outlet of the reverse osmosis module 11) allows the reverse osmosis module 11 to operate at a constant recovery rate.

This optimizes the performance of the electrodeionization module 12, reduces water consumption, and achieves excellent operating conditions of the reverse osmosis module 11.

It must be understood that the present invention is in no way limited to the embodiment described above and that many modifications can be made thereto without departing from the scope of the invention.

In particular, the electrodeionization module could instead be placed in series with a plurality of reverse osmosis modules disposed in parallel. In this case, one flowrate regulator per reverse osmosis module could be provided (at the permeate outlet of the chamber containing the module or directly in the permeate manifold of the module), or a flowrate regulator regulating the total flowrate at the input of the electrodeionization module.

Moreover, if a motorized valve is used as a flowrate regulator, the flowrate at the outlet of the reverse osmosis module could be controlled, for example, by means of a turbine flowmeter functionally connected to the control system of the water purification system with the motorized valve slaved to the control system.

The flowrate regulator could also be designed differently and, for example, include an O-ring acting as a spring that operates on two mobile rigid parts defining a variable fluid passage orifice, causing them to move toward each other or away from each other to vary the section of the fluid passage orifice. A pressure compensating regulator (PCR) of the above kind is available from NEOPERL®.

The invention claimed is:

1. A water purification system comprising:
    a pump having an aspiration side adapted to aspirate water to be purified and a discharge side adapted to discharge under pressure water entering the pump;
    a liquid phase separator operating by permeation through at least one selective permeability membrane as a result of a pressure gradient and having an inlet in fluid communication with the discharge side of the pump, a permeate outlet, and a retentate outlet;
    an electrodeionization unit having a permeate inlet in fluid communication with said permeate outlet of said separator and a purified water outlet;
    an evacuation stream for evacuating the retentate from the system to a system drainage outlet, in fluid communication with the retentate outlet of said separator, and incorporating a restriction to reduce the retentate flowrate in the vicinity of the drainage outlet of the system;
    and a recirculating stream whereby the evacuation stream communicates with said aspiration side of said pump, between the retentate outlet of the separator and said restriction and
    incorporating a pressure regulator to maintain,
        (i) in conjunction with said pump, a substantially constant predetermined pressure across said restriction so as to obtain a constant reverse osmosis retentate flow to waste regardless of the feed pressure,
        and (ii) in conjunction with said restriction, a constant predetermined pressure at said inlet of said separator, so as to maintain a substantially constant predetermined retentate flowrate to waste independently of the water temperature.

2. The water purification system of claim 1, further comprising a flowrate regulator disposed in the permeate flow path from said separator to said electrodeionization unit and is configured for maintaining a substantially constant predetermined permeate flowrate in the event of a water temperature rise or a water temperature and upstream pressure rise.

3. The water purification of claim 2, wherein said flowrate regulator comprises a motorized flowrate regulation valve operated by an automatic controller.

* * * * *

UNITED STATES PATENT AND TRADEMARK OFFICE
CERTIFICATE OF CORRECTION

PATENT NO. : 7,938,956 B2
APPLICATION NO. : 12/704807
DATED : May 10, 2011
INVENTOR(S) : Yves Gaignet Page 1 of 1

It is certified that error appears in the above-identified patent and that said Letters Patent is hereby corrected as shown below:

On the Title page, Item (63) under "Related U.S. Application Data", in column 1, line 5, below "7,407,585." insert -- (30) Foreign Application Priority Data    Mar. 13 2003 (FR).........03 03110 --.

Signed and Sealed this
Thirteenth Day of December, 2011

David J. Kappos
*Director of the United States Patent and Trademark Office*